Patented Aug. 19, 1952

UNITED STATES PATENT OFFICE 2,607,797

N,2-CARBOALKOXYETHYL DERIVATIVES OF ALPHA-AMINO ACIDS AND OF ACYLATED ALPHA-AMINO ACIDS

Leonard L. McKinney, Eugene H. Uhing, Eugene A. Setzkorn, and John C. Cowan, Peoria, Ill., assignors to the United States of America as represented by the Secretary of Agriculture No Drawing. Application November 22, 1949, Serial No. 128,902

13 Claims. (Cl. 260—471)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the N,2-carboalkoxyethyl derivatives of alpha-amino acids and to a method for the preparation of these compounds. The invention has for its objects the provision of these derivatives as a new class of chemical compounds, and moreover their preparation from cyanoethyl derivatives of amino acids.

The products of this invention have the following general structural formula:

Z—N—CH$_2$—CH$_2$—CO—OR'
 |
R—CH—CO—OR' where R is the residual group of the alpha- 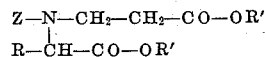
amino acids in any of their optical isomeric or racemic forms, R' represents the aliphatic radical of the aliphatic alcohols, i. e., R'OH, and Z is a member of the group consisting of H, R"CO and CH$_2$CH$_2$COOR' in which R" may be an aliphatic or an aromatic hydrocarbon radical. R and Z may be combined in a single carbon-to-carbon chain to form closed rings, such as are found for example in proline and glutiminic acid.

Three general types of compounds are thus included in the invention, as follows:

NH—CH$_2$—CH$_2$—CO—OR'
 |
R—CH—CO—OR'     (I)

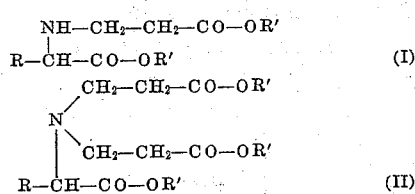

and

R"CO—N—CH$_2$—CH$_2$—CO—OR'
 |
R—CH—CO—OR'     (III)

The new compounds are high boiling liquids, useful as intermediates in the production of pharmaceuticals, synthetic resins, artificial fibers, plastics and insecticides, and as plasticizers.

These compounds are produced from the cyanoethylated amino acids described in patent application Ser. No. 84,257, filed March 29, 1949 (now Patent No. 2,538,024), by the simultaneous hydrolysis and esterification, i. e., alcoholysis, of the nitrile group.

In general, alcoholysis is carried out by reacting the cyanoethylated amino acids with an aliphatic alcohol in the presence of a non-oxidizing mineral acid and adding sufficient alkali to the reaction mixture to convert the resulting salt of the ester to the free ester. The reaction for producing type I compounds may be represented schematically as follows:

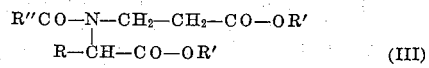

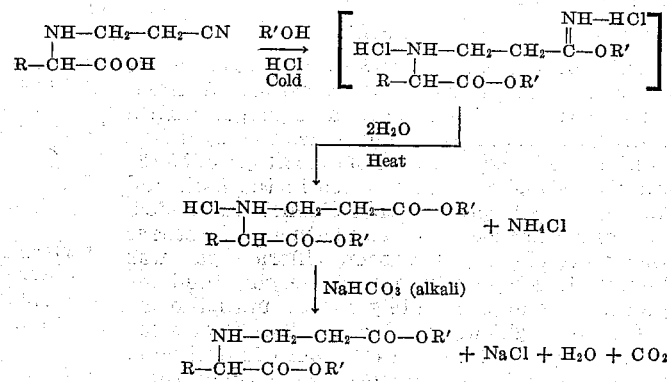

Compounds of type II are produced by a similar process, employing the corresponding dicyanoethylated amino acids.

In the above equations other non-oxidizing mineral acids, such as sulfuric and phosphoric or the like may be substituted for the hydrogen chloride in the initial step. We prefer to employ dry hydrogen chloride because of the ease of removing excess acid by evaporation after completion of alcoholysis of the nitrile group.

The esterification reaction may be followed by filtering off the ammonium salt of the mineral acid and weighing the quantity obtained.

In the structural formulae given above, R may represent an aliphatic or araliphatic group. It may also be heterocyclic, as for example in the N,carboalkoxyethyl derivatives of tryptophane and histidine. The amino acids used in the process of the invention may be naturally occurring or synthetically produced alpha-amino acids. Moreover, the acids may be in any of their optical isomeric forms or racemic mixtures. We may use acids in isolated and purified form, or mixtures of the acids with small amounts of impurities, or even mixtures of unisolated amino acids, such as for example, protein hydrolysates. The amino acids or mixtures of amino acids are readily cyanoethylated in accordance with the process described in patent application Ser. No. 84,257, filed March 29, 1949, and the cyanoethyl derivatives serve as starting materials to prepare the compounds described in this invention.

Acylation of type I compounds may be carried out by conventional methods using organic acylating agents, such as with acetic acid-acetic anhydride, stearyl chloride, benzoyl chloride or the like, to give compounds of type III.

Compounds of type III possess many advantageous properties by virtue of the change in functional form of the amine group to the amide group. One of the more outstanding of these properties is increased chemical stability. Even though compounds of types I and II possess generally good stability, those of type III stand for long periods of time without decomposing. They may be heated to relatively high temperatures, a property which adds to their value as plasticizers. Moreover, in further reaction to form polymeric derivatives, their stability increases the overall efficiency of the reaction.

The compounds of this invention are distillable liquids, and when mixtures of amino acids, such as for example, protein hydrolysates or byproduct mixtures from the manufacture of monosodium glutamate are used, the esterified compounds are readily separated by fractional distillation. This method of separation is more economical than that of separating the free amino acids.

The following specific examples are illustrative of the invention.

EXAMPLE 1

*Ethyl-N-(carbethoxymethyl)-beta-alanine, its hydrochloride and N-acetyl derivative.*—A three-necked round bottom flask was equipped with a stirrer, thermometer, and attached to a hydrogen chloride generator. One mole (128.1 g.) of N-(2-cyanoethyl)-glycine was placed in the flask and 750 ml. of 99 percent ethyl alcohol was added. The flask was placed in an ice bath and the stirrer was started. Dry hydrogen chloride gas was bubbled into the mixture, while keeping the temperature at approximately 10° C., until the increase in weight was 208 grams. The clear solution was then refluxed for one hour while stirring. During the refluxing ammonium chloride formed and precipitated. The volume was then reduced by evaporating, at reduced pressure, to remove excess hydrogen chloride. The ammonium chloride was filtered off and washed with a small volume of absolute ethyl alcohol (wt.=55.0 g.; calc'd. 53.46 g. N anal.: Found 25.62; calc'd. 26.20). The clear filtrate was then divided into two equal portions.

*Esther hydrochloride.*—The volume of the first portion was adjusted to 700 ml. with absolute ethyl alcohol and 400 ml. of ether was added. Crystallization occurred on cooling with Dry Ice, yielding 92 g. of crystals (87 percent). Ten grams were recrystallized from 100 ml. of alcohol and gave a melting point of 85°–87° C. N anal.: Found 5.86; calc'd. 5.85.

*Free ester.*—To the second portion of the filtrate sodium bicarbonate (0.5 mole) was added and the mixture was heated on a steam bath, while stirring, until effervescence had ceased. After filtering, the process was repeated with 0.25 moles of sodium bicarbonate. The alcohol was then distilled off under reduced pressure leaving an oil weighing 94.5 g. The oil was distilled at 1–2 mm. pressure and the main fraction 77.5 g. distilled at 95°–103° C. This fraction was then redistilled and 71 g. distilling at 97°–100° was collected.

N anal.: Found 6.82; calc'd. 6.88
Sp. gr. 30/30: 1.0533
Refractive index ($t=25°$): 1.4365
B. P. at atmos. pressure: 253°–255° C. with decomposition Analysis agreed with the following formula:

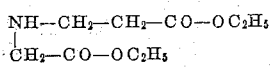

*Acetyl derivative of free ester.*—50.82 g. (0.25 mole) of the free ester was dissolved in 14.5 g. (0.25 mole) of glacial acetic acid and 50 g. (0.5 mole) of acetic anhydride was added. The reaction flask became warm upon addition of the anhydride and after standing overnight was warmed to 50° C. for 2 hours. The acetic acid and excess anhydride was distilled off under reduced pressure, and the residual oil was distilled at 1–2 mm. pressure. The main fraction distilled at 140°–155° C., and was redistilled to give 53 g. (94 percent yield) of the purified product.

N anal.: Found 5.69; calc'd. 5.71
Sp. gr. 30/30: 1.1117
Refractive index ($t=25°$): 1.4551
B. P. at atoms. press.: 305°–310° C. with slight decomposition Analysis agreed with the following formula:

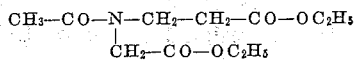

Other acylating agents, such as stearyl chloride and benzoyl chloride, may be substituted in the above example instead of the acetylating mixture to produce the corresponding stearyl and benzoyl derivatives.

EXAMPLE 2

*N-bis-(2-carbethoxyethyl)-glycine-ethyl-ester.*—One-half mole (90.5 g.) of N-bis-(2-cyanoethyl)-glycine was treated with alcoholic-hydrogen chloride as described in Example 1. 500 ml. of 95 percent ethyl alcohol and 143 g. of hydrogen chloride gas was used. After refluxing for 2 hours on a steam bath, 50 g. (calc'd. 53 g.) of ammonium chloride was filtered off. After evaporating to remove excess hydrogen chloride, 100 g. of sodium bicarbonate was added and the mixture warmed, with stirring for 30 minutes. After filtering, the neutralization step was repeated. Alcohol was distilled off to give an 86 percent yield of the crude product. Upon distilling at 1–2 mm. pressure, the main fraction came over at 137°–150° C. Upon redistilling, the main fraction came over at 130°–135° C. The product was slightly cloudy and was washed with water and dried with calcium sulfate to give a clear liquid. Overall yield: 50 percent.

N anal.: Found 4.60; calc'd. 4.61

Analysis agreed with the following formula:

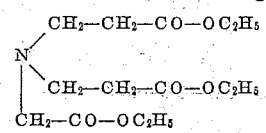

EXAMPLE 3

*N - (2 - carbethoxyethyl) -alpha-alanine-ethyl-ester, its hydrochloride and acetyl derivative.*—One mole (142.15 g.) of N-(2-cyanoethyl)-alpha-alanine was treated with 750 ml. of 99 percent ethyl alcohol and 220 g. of dry hydrogen chloride as described in Example 1. The solution slowly cleared upon adding the first 100 g. of HCl gas. After 150 g. of HCl had been added, the solution became milky. The mixture was refluxed on a steam bath for one hour and rapid precipitation of ammonium chloride was observed. The ammonium chloride (50 g.; calc'd. 53.5 g., N anal.: Found 25.85; calc'd. 26.20) was filtered off and the filtrate was evaporated to approximately 600 ml. and filtered to remove a small amount of ammonium chloride that had precipitated. The filtrate was adjusted to 650 ml.

*Ester hydrochloride.*—One-fourth of the filtrate was evaporated to dryness under reduced pressure. Benzene was added to the sirupy residue and evaporated off to remove traces of moisture. The semi-solid residue was dissolved in chloroform and ether was added. Upon cooling on Dry Ice a colorless sirup layered out. The flask was then set at room temperature whereupon crystallization occurred. The crystals (45 g.) were filtered off, a 71 percent yield.

N anal.: Found 5.55; calc'd. 5.55
M. P.: 74°–76° C.

*Free ester.*—The remaining three-fourths of the filtrate was treated with 1.5 moles of sodium bicarbonate and filtered, followed by a second treatment of 1.5 moles. The alcohol was then distilled off leaving 147 g. (90 percent yield) of the crude ester. The clear oil was distilled at 1-2 mm. pressure and the middle fraction (114 g.) came over at 89°–92° C. Upon redistilling, 111 g., boiling at 89°–91° was obtained (overall yield 68 percent).

N anal.: Found 6.37; calc'd. 6.44
Sp. gr. 30/30: 1.0222
Refractive index ($t=25°$): 1.4325
B. P. atmos. pressure: 245° C. with slight decomposition Analysis agreed with the formula:

$$NH-CH_2-CH_2-CO-OC_2H_5$$
$$CH_3-CH-CO-OC_2H_5$$

*Acetyl derivative.*—One-fifth mole of the free-ester was dissolved in 0.2 mole of glacial acetic acid and 0.4 mole of acetic anhydride added as described in Example 1. After distilling off acetic acid and excess anhydride, the residual colorless oil was distilled at 1-2 mm. pressure and the fraction boiling at 170°–175° C. was collected. This fraction was redistilled to give a main fraction of 50 g. (97 percent yield).

N anal.: Found 5.39; calc'd. 5.40
Sp. gr. 30/30: 1.0914
Refractive index ($t=25°$): 1.4549
B. P. atmos. pressure: 304° C. with very slight browning

EXAMPLE 4

*N -(2-carbethoxyethyl) - leucine-ethyl-ester.*—Three-tenths mole (56 g.) of N-(2-cyanoethyl)-L-leucine was treated with alcoholic-HCl as described in Example 1. Because of the low solubility of the product, 700 ml. of 99 percent ethyl alcohol was used and a total of 112 g. of dry hydrogen chloride was added. After refluxing for 2 hours, 15.2 g. of ammonium chloride was filtered off (calc'd. 16.05). The clear solution was then evaporated to 400 ml. and treated with one mole of sodium bicarbonate. After filtering, a second treatment was made with 0.55 moles of NaHCO$_3$. The alcohol was distilled under reduced pressure leaving a residual colorless oil weighing 72 g. The oil was twice distilled and 62 g., boiling at 105°–110° C. at 2 mm. pressure was obtained (80 percent yield).

N anal.: Found 5.33; calc'd. 5.40
Sp. gr. 30/30: 0.9794
Refractive index ($t=25°$): 1.4358
B. P. atmos. pressure: 270° C.

Analysis agreed with the formula:

$$CH_3 \qquad NH-CH_2-CH_2-CO-OC_2H_5$$
$$\diagdown CH-CH_2-CH-CO-OC_2H_5$$
$$CH_3 \diagup$$

EXAMPLE 5

*N -(2 - carbethoxyethyl) - methionine - ethyl-ester, and its acetyl derivative.*—One-fourth mole (50.5 g.) of N-(2-cyanoethyl-DL-methionine was treated with alcoholic-HCl as described in Example 1. 350 ml. of 99 percent ethyl alcohol and 134 g. of dry HCl gas was used. The reaction mixture was heated at 60°–70° C. for 1 hour and 13.25 g. of NH$_4$Cl filtered off (calc'd. 13.37 g.). The filtrate was neutralized to pH 6.9 with NaHCO$_3$, filtered, and the alcohol distilled off. The main fraction distilled at 145°–150° C. at 1-2 mm. pressure. Yield: 70 percent.

N anal.: Found 5.15; calc'd. 5.05
Refractive index ($t=25°$): 1.4720

Analysis and properties indicated the following formula:

$$NH-CH_2-CH_2-CO-OC_2H_5$$
$$CH_3-S-CH_2-CH_2-CH-CO-OC_2H_5$$

*Acetyl derivative.*—One-eighth mole (34.7 g.) of the above ester was dissolved in glacial acetic acid and treated with acetic anhydride as described in Example 1. The product distilled at 166°–170° C. at 1-2 mm. pressure for a yield of 85 percent.

N anal.: Found 4.42; calc'd. 4.40
Refractive index ($t=25°$): 1.4845

The free ester was somewhat unstable on standing, whereas the acetyl derivative did not change on aging.

EXAMPLE 6

*N -(2-carbethoxyethyl) - phenylalanine - ethyl-ester-hydrochloride and the acetyl derivative of the free ester.*—N-(2-cyanoethyl)-DL-phenylalanine (0.053 mole) was treated with 99 percent ethyl alcohol (100 ml.) and dry HCl (100 g.) as described in Example 1. The ammonium chloride (2.6 g.) filtered off and the filtrate divided into equal parts:

*The hydrochloride.*—One-half of the filtrate was placed on Dry Ice to effect crystallization. The crystals (6.2 g., 73 percent yield) were removed (N anal.: Found 4.50; calc'd. 4.25). In order to remove the small amount of NH$_4$Cl, the product was recrystallized from chloroform-ether solution.

N anal.: Found 4.19; calc'd. 4.25
M. P.: 101°–103° C.

*Acetyl derivative.*—One-half of the filtrate was neutralized with NaHCO₃, filtered, and the alcohol distilled off. The sirup was dissolved in one equivalent of glacial acetic acid and 3 equivalent of acetic anhydride added. After standing overnight the reaction mixture was heated at 50° C. for 2 hours. After removing solvent and excess anhydride the residual oil was distilled to give 4.6 g. boiling at 175°–177° C. at 1–2 mm. pressure.

N anal.: Found 4.15; calc'd. 4.18
Refractive index (t=25°): 1.500

Analysis agreed with the formula:

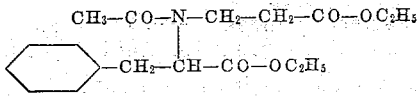

EXAMPLE 7

*N-(2 - carbethoxyethyl) - tyrosine - ethyl-ester.*—One-fourth mole (58.56 g.) of N-(2-cyanoethyl)-L-tyrosine was treated with 500 ml. of 99 percent ethyl alcohol and 163 g. of dry HCl as described in Example 1. After filtering off NH₄Cl (14 g.; calc'd. 13.4 g.), excess HCl was removed by evaporating. The solution was then neutralized to pH 6.8 with a NaHCO₃, filtered, and the remainder of alcohol filtered off. A dark viscous oil was obtained in 80 percent yield. Analysis of the crude product indicated that it was sufficiently pure for many uses—N: Found 4.45; calc'd. 4.53, agreeing with the formula:

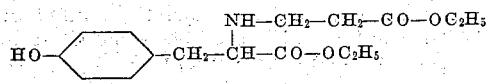

EXAMPLE 8

*N-(2-carbethoxyethyl) - diethylaspartate and its acetyl derivative.*—One-fourth mole (46.5 g.) of N-(2-cyanoethyl)-DL-aspartic acid was treated with 350 ml. of 99 percent ethyl alcohol and 143 g. of dry HCl as described in Example 1. Ammonium chloride was removed and the filtrate neutralized to pH 6.5 with NaHCO₃. Part of the alcohol was distilled off whereupon the product gelled. The gelatinous material was subjected to distillation at 1–2 mm. pressure and the main fraction (44 g. or 60 percent yield) distilled at 138°–140° C.

N anal.: Found 4.75; calc'd. 4.83
Refractive index (t=25°): 1.4440

Analysis agreed with the formula:

```
NH—CH₂—CH₂—CO—OC₂H₅
|
CH—CO—OC₂H₅
|
CH₂—CO—OC₂H₅
```

*Acetyl derivative.*—One-eighth mole (36.1 g.) of the free ester was acetylated as described in Example 1 and the product distilled at 1–2 mm. pressure. The main fraction (36 g. or 90 percent yield) distilled at 180°–185° C.

N anal.: Found 4.26; calc'd. 4.23
Refractive index (t=25°): 1.4571

EXAMPLE 9

*N-(2-carbethoxyethyl)-ethyl - glutiminate.*—One-fourth mole (45.5 g.) of N-(2-cyanoethyl)-L-glutiminic acid was treated with 300 ml. of 99 percent ethyl alcohol and 145 g. of dry HCl as described in Example 1. Ammonium chloride was filtered off, and the alcohol was distilled from the reaction mixture. The oily residue was distilled at 1–2 mm. pressure and the main fraction (47 g. or 73 per cent yield) came over at 144°–145° C.

N anal.: Found 5.38; calc'd. 5.44
Refractive index (t=25°): 1.4650

Analysis agreed with the formula:

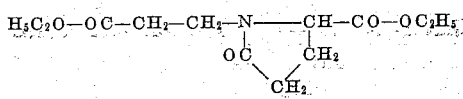

EXAMPLE 10

*N-(2-carbobutoxyethyl)-butyl - alaninate and its acetyl derivative.*—Although the ethyl ester was prepared in the above examples, other esters may be prepared by employing somewhat the same technique: One-half mole (71 g.) of N-(2-cyanoethyl)-DL-alanine was treated with 350 ml. of n-butyl alcohol and 154 g. of dry HCl as described in Example 1. After removing the NH₄Cl, the filtrate was divided into two equal portions.

*Free ester.*—One portion was neutralized to pH 6.5 with a NaHCO₃ and unreacted butyl alcohol removed by evaporating on a steam bath. The residue was distilled at 1–2 mm. pressure, with the main fraction distilling at 116°–125° C. Upon redistilling, the fraction (69 percent overall yield) distilling at 120°–125° C. was saved.

N anal.: Found 5.19; calc'd. 5.12
Refractive index (t=25°): 1.4384

Analysis agreed with the formula:

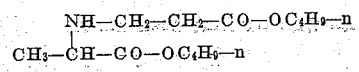

*Acetyl derivative.*—The second portion of the filtrate was neutralized with NaHCO₃ and unreacted butyl alcohol removed by evaporating on a steam bath. The oil was dissolved in 0.25 mole of glacial acetic acid and 0.5 mole of acetic anhydride added. After standing overnight the acetic acid and unreacted anhydride was distilled off. The oily residue was distilled at 1–2 mm. pressure an the fraction (64 g. or 81 percent yield) distilling at 156°–157° retained.

N anal.: Found 4.39; calc'd. 4.40
Refractive index (t=25°): 1.4549

EXAMPLE 11

*Mixed amino acids.*—A commercial sample, consisting primarily of leucine, isoleucine and methionine (N=9.57 percent) and obtained as a byproduct from the manufacture of monosodium glutamate, was used. The crude "cake" (200 g.) was first reacted with acrylonitrile by suspending in water and adding sodium hydroxide (1.366 moles) equivalent to the nitrogen content of the amino acid cake. One equivalent, based on nitrogen content, of acrylonitrile was added and after standing overnight at room temperature was warmed to 65°–70° C. for 2 hours. The reaction mixture was acidified with 1.366 moles of hydrochloric acid and evaporated to dryness. The dry residue was treated with one liter of 99 percent ethyl alcohol and 6.5 moles of dry HCl as described in Example 1. After reducing the volume by evaporating on a steam bath to remove excess HCl, the salts were filtered off. The colored solution was neutralized to pH 7.0 with Na₂CO₃, and again filtered. The alcohol was distilled off, leaving a colored oily residue weighing 265.5 g. (N=5.42 percent). The residue was distilled at 1–2 mm. pressure and 3 fractions collected, as shown in Table I.

Table I

| Fraction | B.P./1-2 mm. °C. | Weight (g.) | Percent N |
|---|---|---|---|
| 1 | 70-125 | 30 | 6.10 |
| 2 | 125-135 | 132 | 5.73 |
| 3 | 150-200 | 19 | 6.16 |

EXAMPLE 12

*Acetyl derivative.*—A neutralized oily residue obtained as in the above example was acetylated as described in Example 1, and subjected to distillation at 1-2 mm. pressure. Two fractions were obtained as shown in Table II.

Table II

| Fraction | B.P./1-2 mm. °C. | Weight (g.) | Percent N |
|---|---|---|---|
| 1 | 110-146 | 76.7 | |
| 2 | >146 | 18 | 4.66 |
| Residue in still | | 8.4 | |

Fraction No. 2 was redistilled and 53 g. were collected at 155°-157° range. This fraction contained 4.63 percent nitrogen in agreement with that for either the leucine or isoleucine derivative (calc'd. 4.65).

We claim:

1. A new composition of matter of the group consisting of N-(2-carbethoxyethyl)-tyrosine-ethyl ester, N-(2-carbethoxyethyl)-leucine-ethyl ester, N-(2-carbethoxyethyl)-diethylaspartate, N-acetyl, N-(2-carbethoxyethyl)-diethylaspartate and N-acetyl, N-(2-carbethoxyethyl)-methionine-ethyl-ester.

2. N-(2-carbethoxyethyl)-tyrosine-ethyl-ester

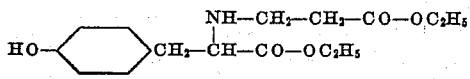

3. N-(2-carbethoxyethyl)-leucine-ethyl-ester

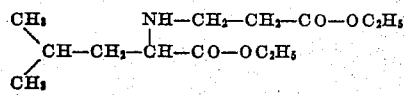

4. N-(2-carbethoxyethyl)-diethylaspartate

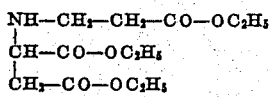

5. N-acetyl, N-(2-carbethoxyethyl)-diethylaspartate of the following formula

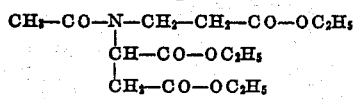

6. N-acetyl, N-(2-carbethoxyethyl)-methionine-ethyl-ester of the following formula:

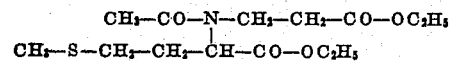

7. The process which comprises subjecting N-(2-cyanoethyl)-L-tyrosine to alcoholysis by reacting with an aliphatic alcohol in the presence of a non-oxidizing mineral acid and adding sufficient alkali to the reaction mixture to free the resulting ester.

8. The process which comprises subjecting N-(2-cyanoethyl)-L-leucine to alcoholysis by reacting with an aliphatic alcohol in the presence of a non-oxidizing mineral acid and adding sufficient alkali to the reaction mixture to free the resulting ester.

9. The process which comprises subjecting N-(2-cyanoethyl)-DL-methionine to alcoholysis by reacting with an aliphatic alcohol in the presence of a non-oxidizing mineral acid and adding sufficient alkali to the reaction mixture to free the resulting ester.

10. The process which comprises subjecting N-(2-cyanoethyl)-DL-aspartic acid to alcoholysis by reacting with an aliphatic alcohol in the presence of a non-oxidizing mineral acid and adding sufficient alkali to the reaction mixture to free the resulting ester.

11. The process which comprises subjecting a mixture of cyanoethylated amino acids obtained by reacting the amino acid cake byproduct from the manufacture of monosodium glutanate, said cake consisting primarily of leucine, isoleucine and methionine, to alcoholysis by reacting said mixture with an aliphatic alcohol in the presence of a non-oxidizing mineral acid and adding sufficient alkali to the reaction mixture to free the resulting mixed esters.

12. Process according to claim 11 in which the resulting mixed esters are further subjected to the action of an organic acylating agent whereby the amino hydrogens are replaced by the organic acyl groups.

13. A process which comprises subjecting a compound of the following structural formula

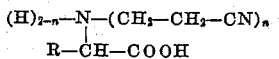

in which R is a member selected from the group consisting of aliphatic and araliphatic radicals, and $n$ is an integer from 1 to 2, to simultaneous hydrolysis and esterification to convert the nitrile group and the carboxyl group into ester groups by reacting with an aliphatic alcohol in the presence of a non-oxidizing mineral acid, adding sufficient alkali to the reaction mixture to free the resulting ester, separating the free ester from the reaction mixture and subjecting it to the action of an organic acylating agent whereby the amino hydrogen is replaced by an organic acyl group.

LEONARD L. McKINNEY.
EUGENE H. UHING.
EUGENE A. SETZKORN.
JOHN C. COWAN.

REFERENCES CITED

The following references are of record in the file of this patent:

UNITED STATES PATENTS

| Number | Name | Date |
|---|---|---|
| 2,293,034 | Moore | Aug. 18, 1942 |
| 2,463,989 | McElvain | Mar. 8, 1949 |
| 2,469,317 | Shokal | May 3, 1949 |

OTHER REFERENCES

Ruzicka et al., Helv. Chim. Acta 5, pages 715-720 (1922).